…

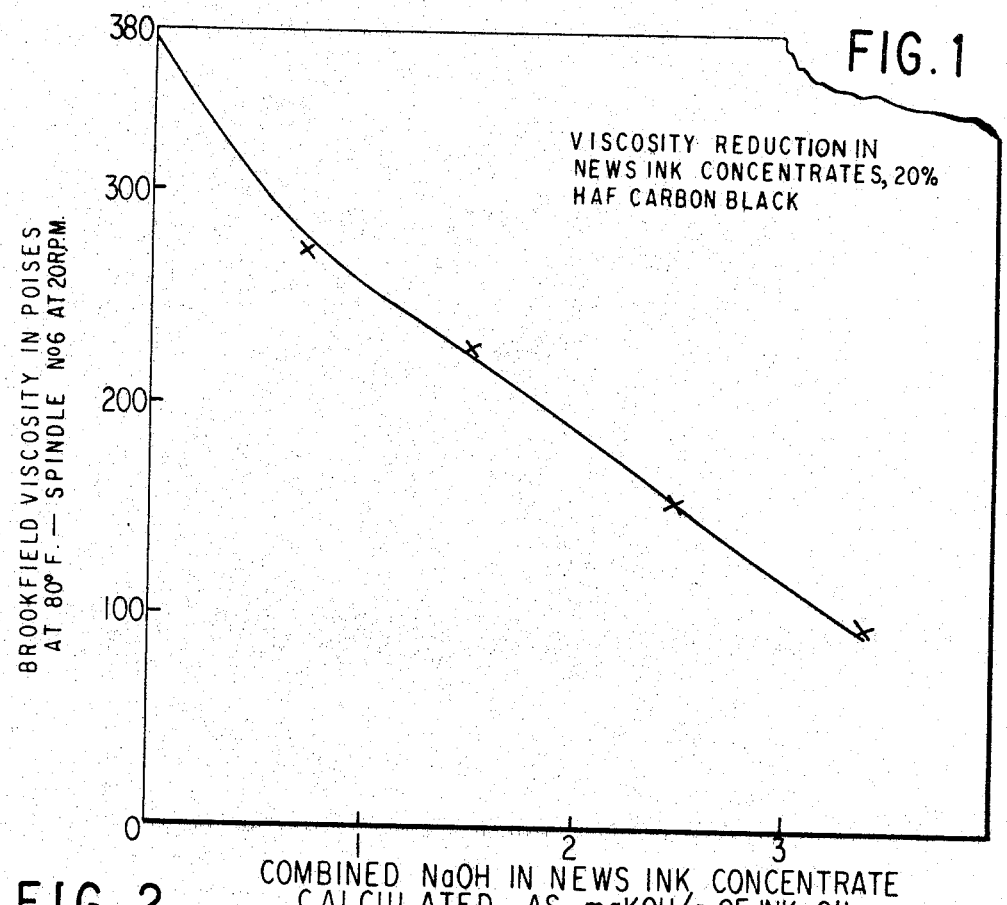
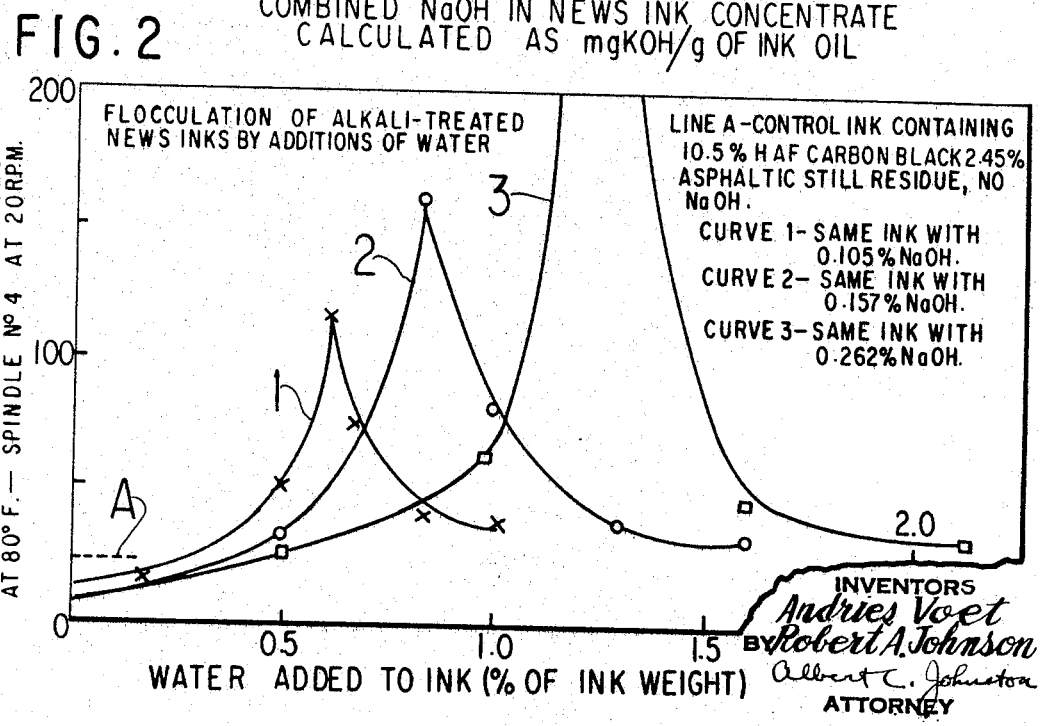

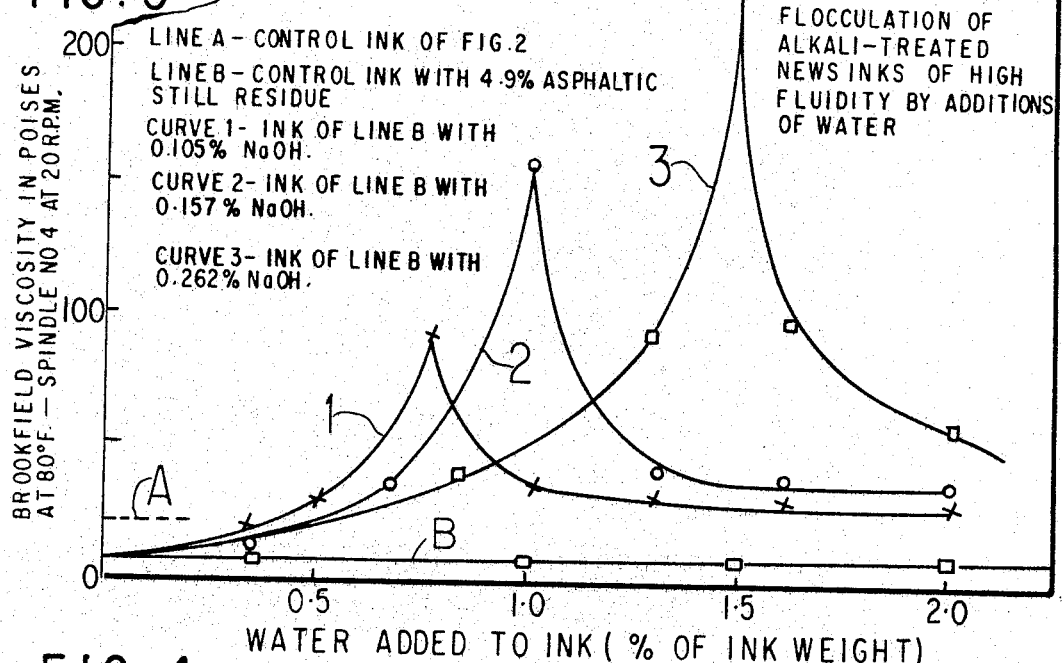
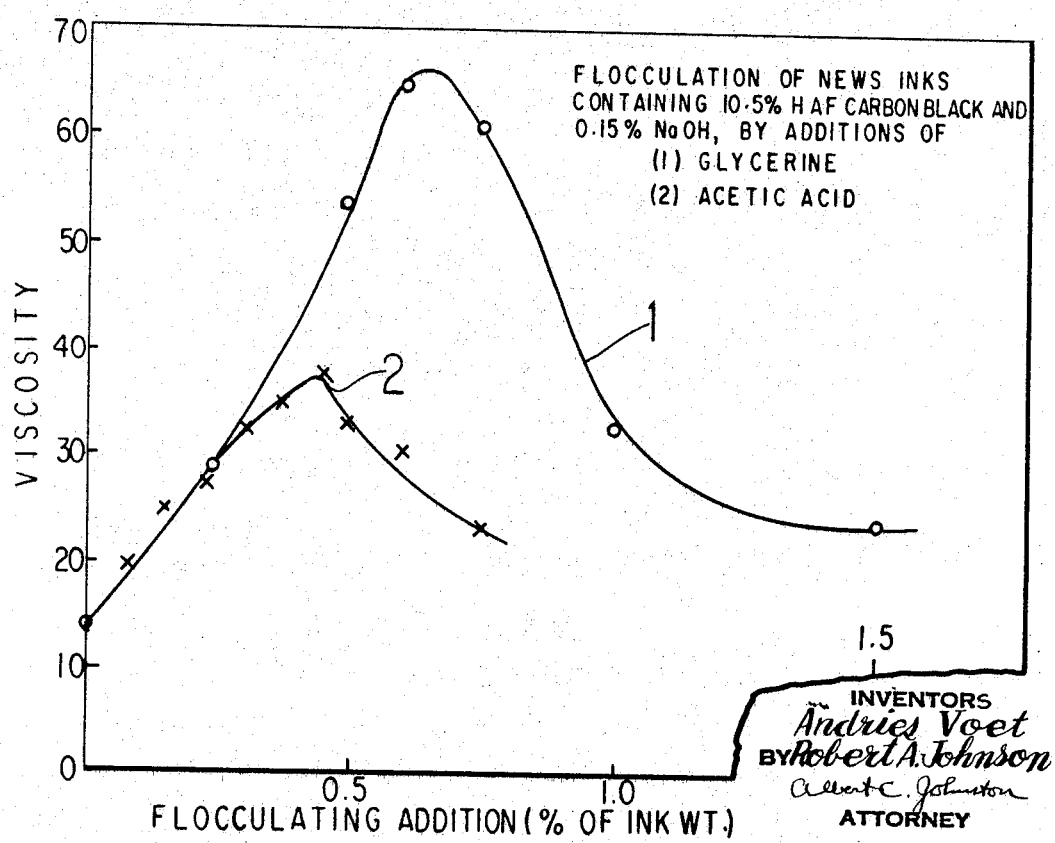

United States Patent Office 3,330,673
Patented July 11, 1967

3,330,673
METHOD OF PREPARING NEWS INKS AND THE LIKE
Andries Voet and Robert A. Johnson, Borger, Tex., assignors to J. M. Huber Corporation, Locust, N.J., a corporation of New Jersey
Filed Aug. 20, 1965, Ser. No. 481,292
16 Claims. (Cl. 106—32)

This application is a continuation-in-part of our copending application, Ser. No. 236,121, filed Nov. 7, 1962, now abandoned This invention relates to a method of preparing news inks and the like and, more particularly, to a method of controlling the rheological properties of the inks so as to make them better suited for printing needs and to produce them more economically than heretofore.

News inks are prepared by mechanically dispersing carbon black in mineral ink oil. The oil serves as a vehicle for the carbon particles. The rheological properties of the dispersion are determined by the properties, the concentrations and the interaction of the oil and the carbon black and are of great importance in the ultimate use of the ink.

When conventional furnace carbon blacks are dispersed in ordinary mineral oils to a concentration required for good printing, which usually is in the range of 10 to 14% by weight, the carbon particles tend to chain together to form a dispersion having objectionable shortness or thixotropic properties.

The shortness can be overcome by adding more oil to the dispersion, but this would ordinarily make the pigmentation too weak. It is customary, instead, to give the ink the required "length" by making use of a mineral ink oil containing resinous or asphaltic polar substances rich in polar compounds, which will coat the carbon particles and reduce their tendency to chain together.

Such an ink oil may be obtained by petroleum fractionation or, perhaps, from natural sources, but it is usually provided by dissolving a small amount of a resinous or asphaltic substance, for example, an asphaltic still residue, in a suitable petroleum oil. The amount of this substance to be employed, hence the degree of deflocculation available by the use of it, is, however, limited by the fact that colorless resinous substances are both costly and detrimental to the required speed of penetration of the ink vehicle into the paper to be printed, while the less costly asphaltic substances, being highly colored, will stain the paper receiving the ink.

The required smooth dispersion of carbon black in the ink oil is ordinarily produced by intensively grinding the materials together in a suitable mill such as a ball mill. The efficiency and economy of the grinding and, as well, the economy of transporting the dispersion to localities where inks are required increase with increasing concentrations of carbon black in the grinding mixture. It therefore is important that the grinding takes place with the pigment at a concentration much higher than required in the ink. Yet there is a countervailing requirement that the concentrated dispersion, or ink concentrate, be fluid enough to flow readily from the mill and through pipe lines. In addition, it must be easily convertible, as by simple dilution with ink oil, into finished ink having the required printing qualities.

In conventional news ink manufacture, ink concentrates having the required fluidity are produced with carbon black concentrations as high as about 20 to 22% by weight. These are diluted with ink oil to form inks having pigment loadings in the range of 10 to 14%, the most common loadings being at 10.5 to 11.5%, together with viscosities suited to printing conditions. The viscosities most commonly are in the range of 15 to 35 poises but sometimes may be higher, up to a limit of about 40 poises (as measured at 80° F. by a Brookfield RVF Viscometer with the use of spindle #4 at 20 r.p.m.).

While fluid ink concentrates having higher pigment loadings may be obtained by adding surfactants to defloculate the grinding mixture, when these concentrates are diluted to the pigment concentrations desired for printing the resulting inks are often too low in viscosity to perform satisfactorily on newspaper printing presses. Accordingly, only limited use can be made of such surfactants in known practice, for once they have been added to the materials their effects cannot be nullified or reversed economically.

It is, therefore, a primary object of the present invention to provide a method of preparing printing inks such as news inks and the like, by which the inks can be made with any desired basic composition or pigment concentration and still can be given any of many viscosities desirable for various uses of the inks; and, further, to achieve this benefit without resort to expensive deflocculating or thickening agents or to discoloring additions to the inks.

Another object of the invention is to enable the easier and more economical conversion of carbon black and ink oil into smooth dispersions suitable for printing or for dilution to constitute a good printing ink.

Another object of the invention is to enable the production of fluid news ink concentrates which have extraordinarily high contents of carbon black, so that important savings can be realized in the grinding operations and in transporting the concentrates to localities where they will be diluted to the pigment concentrations required for printing; and yet to enable finished inks having any desired viscosity within a very wide range of viscosities to be provided upon the dilution of the concentrates.

A further object of the invention is to provide improved news inks and the like which have distinctive combinations of pigment loadings and viscosities, including some in which the pigment loadings are lower than those required heretofore yet the viscosities still are well suited to the printing needs.

Still another object is to provide news inks and the like in which the carbon black exhibits a color strength higher than that attained in conventionally prepared inks of like pigment content.

The present invention is based in part upon the discovery that when news inks and the like or concentrates for dilution to make them are prepared by grinding or similarly dispersing a hydrophobic pigment such as furnace carbon black or a calcined channel black in an ink oil which contains polar compounds, the viscosity of the dispersion formed by the grinding and of one obtained by dilution of the ground mixture with such ink oil will be very materially reduced if the oil present, or at least some constituents of it, have been reacted with an alkaline substance such as an alkali metal or a metal selected from the group consisting of calcium, barium and strontium, or a hydroxide or other alkaline-reacting compound of such metal or of ammonium. Among the alkaline substances effective for the deflocculating reaction are metallic sodium, potassium, calcium, barium and strontium, the hydroxides, oxides and alkaline-reacting salts of these metals, ammonium hydroxide and alkaline-reacting salts of ammonium.

It has also been discovered that the reduction of the viscosity of the dispersion can be effected and controlled by carrying out the grinding of the pigment in the oil in the presence of the alkaline substance or of oil of the kind specified that has been previously reacted with the alkaline substance.

In that way one can readily prepare fluid inks and ink concentrates having pigment concentrations in the range of about 10 to 25% but with viscosities far lower than those of like dispersions in which the oil has not been reacted with an alkaline substance.

Moreover, fluid ink concenrtates containing dispersed carbon black at concentrations higher than any hitherto practicable, such as in the range of about 27 to 35% by weight, can be prepared by taking full advantage of the deflocculating effect of the reaction product of the oil constituents with the alkaline substance in the course of the grinding. Important economies can thus be realized in the grinding operations, which proceed more efficiently and require less time than otherwise, and also in transporting the concentrates to localities where they will be diluted to give inks having the pigment concentrations required for the printing work to be performed.

The reduction of viscosity effected by the described reaction would ordinarily make inks prepared by the dilution of heavily pigmented concentrates and inks ground directly to desirable relatively low pigment concentrations too fluid for satisfactory use in high speed newspaper printing or the like.

It has been discovered further, however, that the viscosity of a dispersion which has been deflocculated by the alkali reaction product can be increased to any of various values that may be desirable for the printing operations, including values far exceeding the viscosity obtained without the deflocculating reaction, by mixing into the dispersion a suitable very small quantity of water or glycerine, or of an acid that ionizes in the dispersion. Inorganic and organic acids can be used, among them sulfuric acid, phosphoric acid, acetic acid, hydrochloric acid solution, palmitic acid, stearic acid and naphthenic acids.

Although added water, glycerine or acid has no appreciable effect in conventional news ink dispersions, it acts as a strong flocculating agent in the dispersions deflocculated by alkali.

According to the whole of the present invention, therefore, ink dispersions can be formed, either directly or by the dilution of concentrates, with the pigment concentrations and the length which are desired for printing operations yet with viscosities lower than those required, and can then be brought easily to the viscosity desired for the printing work by the simple incorporation of a small quantity of the flocculating agent.

The invention thus provides for wide ranges of selection and control of the pigmentation and printing qualities of news inks and the like, together with extraordinary economy in the preparation of the inks. Among other benefits, it enables the very economical preparation of news inks having reduced carbon black concentrations but with viscosities and printing qualities equivalent to those of conventional news inks requiring higher concentrations of carbon black.

While it is not intended that the invention be limited to any particular theory or mechanism of reaction, it is believed that the phenomena involved may be explained as follows:

(1) A mineral hydrocarbon oil of the kind to be used as the ink oil contains polar compounds which carry active hydrogen at various sites in their polar groups. These compounds are either present in the oil selected or provided by dissolving in a suitable petroleum oil a small quantity, usually about 1 to 4%, of an asphaltic or resinous petroleum fraction, or distillation residue, which has a relatively high content of polar constituents such as acidic and phenolic groups, quinones, lactones, and resins.

(2) A non-acidic pigment such as a normal furnace carbon black or a calcined channel black will form an alkaline or neutral slurry in water. Such a pigment possesses some organophilic and hydrophobic properties. When such a pigment is dispersed in the ink oil, polar compounds of the oil become adsorbed on surfaces of the non-acidic carbon particles and present mutually attractive groups of elements which bring about the formation of a somewhat flocculated dispersion having the "length" required for a good printing ink but with a relatively high viscosity.

(3) On the other hand, when the pigment is dispersed in an ink oil reacted with an alkaline substance as above specified, the polar compounds adsorbed on the carbon particles will have formed alkali metal, alkaline earth metal or ammonium compounds, acting as surfactants formed in situ, which present alkaline structures at sites formerly occupied by active hydrogen atoms. The alkaline portions of these compounds are hydropholic and ionizing to form surface charges of like sign; so the carbon black particles are held apart one from another by the electric charges and a deflocculated dispersion having a relatively low viscosity is formed.

(4) Upon the subsequent mixing of the flocculating agent into the deflocculated dispersion, or into one obtained by the dilution of it with ink oil, molecules of the added water, glycerine or acid become attached at sites of alkaline portions of the compounds clinging to the carbon particles. As a result, these particles no longer repel one another; so that now the dispersion is flocculated and its viscosity increased to an extent dependent, up to a certain limit or peak at which the viscosity begins to fall again, upon the amount of the flocculating agent added to the dispersion.

It is of critical importance to the practice of the invention that the pigment and the ink oil be of the kinds hereinabove specified. The effects described are not attained when a hydrophilic carbon black, such as an oxidized furnace black or a normal channel black, is used in place of non-acidic or hydrophobic carbon black. They are not attained when a petroleum oil not containing polar compounds, such as a white mineral oil, is used as the ink vehicle; although such an oil will serve if a resinous or asphaltic petroleum residue is added to it. The oil to be used ordinarily should have an acid number in the range of 0.1 to 5 before being reacted with the alkaline substance.

Under ordinary conditions, the deflocculation required according to the invention will be effected by the reaction of a hydroxide or other alkaline-reacting compound of an alkali metal or of ammonium with the ink oil in the course of grinding the pigment to a high concentration in the oil; and when or after the ink concentrate is diluted to the pigment concentration desired for the printing, the viscosity of the dispersion will be increased to the extent desired by mixing a small quantity of water or glycerine into the dispersion. Since water is fully effective and is always available at little or no cost, water ordinarily would be selected rather than glycerine for use as the flocculating liquid.

The reaction normally occurring when an alkali metal or an alkaline earth metal is used for the deflocculation is essentially the same as that of an alkaline hydroxide. The ink oil and the grinding mixture containing it normally contain a very small amount of moisture which, although generally adsorbed at hydrophilic sites in the materials present and not large enough to pre-flocculate the dispersion being formed, is quite enough to convert at least some of the metal to hydroxide and ionize the hydroxide so that it will react with polar compounds in the oil. The moisture content of the ink normally ranges from about 0.2% up to about 1%, since commercial furnace blacks normally contain about 1 to 3% by weight of adsorbed moisture while the moisture content of commercial ink oils normally is in the range of about 0.01 to 0.5% by weight.

Accordingly, the reaction of an alkali metal or an alkaline earth metal in metallic form is important only for special cases in which the materials present have been previously dehydrated so as to be substantially anhydrous and thus lacking in the very small amount of moisture normally present in them. In such cases, the metal itself will react directly to replace active hydrogen in polar compounds of the oil and render the oil deflocculating in the pigment dispersion.

The use of an alkaline earth metal or an alkaline earth compound to render the ink oil deflocculating is less advantageous than the use of an alkali metal or an alkali metal or ammonium compound, for the deflocculated dispersion produced by alkaline earth compounds of polar constituents of the oil does not respond as desired to additions of water or glycerine. While additions of an inorganic acid or of an organic acid strong enough to decompose such compounds will strongly flocculate such a dispersion, the use of acid is less desirable than the use of water or glycerine, for obvious reasons; for one, the ink is likely to be objectionably acidic, since an excess of acid is required for the decomposition process.

The required extent of reaction of the alkaline substance with the ink oil does not occur upon merely mixing the materials at room temperature, but it will take place under ink grinding conditions such, for example, as those occurring in a ball mill. In the course of grinding, large surface areas of the oil and the alkali are brought into intimate contact for reaction, and temperatures conducive to reaction are induced by the friction and shearing in the mill. The reaction can be accelerated by externally heating the grinding materials; but the heating temperature preferably is kept below 300° F. at a level which will avoid excessive oxidation and other changes in the oil.

The deflocculating reaction is effected in the presence of an amount of the alkaline substance selected to give the desired reduction of viscosity in the dispersion to be formed. The amount selected generally will be enough to react with substantially all acidity in the oil, so that nearly complete neutralization of the polar compounds may be obtained and a wide range provided for the selection of final ink viscosities by additions of the flocculating agent. In the use of sodium hydroxide, the amount thereof actually to be reacted is at least 0.01% and can range up to about 0.5% of the weight of the ink oil, depending upon the composition and any acidity of the oil and the extent, if any, of the formation of acidic oxidation products in the oil in the course of the grinding.

The water or other agent selected for flocculating the ink dispersion should be added by mixing it gradually and thoroughly into the dispersion. Since water acts almost instantaneously in a dispersion deflocculated by alkali metal or ammonium compounds, it is advantageous to use an intensively acting mixer, such as a proportioning mixer or a homogenizer, to prevent localized overreaction in the dispersion.

The viscosity of the deflocculated dispersion is increased progressively by increasing additions of the flocculating agent, up to a certain limit or peak for any given dispersion beyond which a further addition of the agent will cause a drop of viscosity. Therefore, the amount of the flocculating agent to be added can be selected according to the degree of flocculation desired in the ink, but it ordinarily should not exceed the amount that would bring the dispersion to its peak viscosity.

The finished inks prepared according to the present invention fulfill printing needs better than the news inks heretofore available, due to the fact that they can be made with any desired pigment concentration, such as in the range of 5 to 15% and higher if desired, and can still be given a viscosity suited to the printing requirements.

These inks have a greater color strength for a given pigment loading than do conventional news inks; so they can be prepared with a lower content of carbon, to reduce their cost, without loss of the required color strength.

Moreover, these inks also have a valuable new property in that the carbon black contained in them, in contrast to that of conventional news inks, exhibits an affinity for water which facilitates the de-inking of paper printed with them. This property is important to the use of the inks for the printing of reclaimable newspapers, telephone directories, and the like.

The accompanying drawings present graphs illustrating some of the variations of dispersion viscosities which can be brought about according to the invention.

FIG. 1 indicates the progressive reductions of viscosity effected by increasing amounts of sodium hydroxide in ball milled news ink concentrates containing, per 100 parts, 20 parts by weight of pelletized furnace carbon black and 2 parts of asphaltic still residue.

FIG. 2 illustrates the flocculation of alkali-treated news inks by increasing additions of water, as set forth in Example 11 hereinbelow.

FIG. 3 is a graph comparable to FIG. 2, showing the flocculation of news inks prepared initially with a greater fluidity (lower viscosity) than the control ink of FIG. 2 by the use of a larger concentration of asphaltic still residue.

FIG. 4 illustrates the behavior of certain alkali-treated news inks when flocculated by incremental additions of glycerine and acetic acid.

The following detailed examples further illustrate the effects and practices of the invention.

*Example 1*

An ink concentrate was prepared by grinding 77.7 parts of a commercial ink oil, 2 parts of asphaltic still residue ("Coblax"), 20 parts of pelletized HAF carbon black, and 0.3 part of sodium hydroxide flakes in a laboratory shaker ball mill at a temperature of 200° F. for 30 minutes.

A control composition was prepared by the same procedure except that no sodium hydroxide was present and there were 80 parts of the ink oil.

The above procedures were carried out with the use of each of four different ink oils, which had the following properties:

|  | Ink Oils | | | |
| --- | --- | --- | --- | --- |
|  | (a) | (b) | (c) | (d) |
| Viscosity SSU at 100° F | 800 | 800 | 800 | 800 |
| Specific gravity at 60° F | 0.9315 | 0.9685 | 0.9273 | 0.9600 |
| Flash point, ° F | 405 | 350 | 360 | 370 |
| Color, ASTM D-1500 (Diluted) | 4.5 | 4.5 | 4.5 | 3 |
| Refractive index | 1.5155 | 1.5369 | 1.5070 | 1.5324 |
| Aniline point, ° F | 186 | 125 | 185 | 125 |

The ground ink concentrates exhibited the rheological properties shown in Table I below, from which it is evident that in each case the grinding of the materials in the presence of a very small amount of sodium hydroxide greatly reduced the viscosity of the concentrated dispersion.

TABLE I

| Ink Concentrates | Brookfield Viscosities at 80° F., Spindle #6 | | | |
| --- | --- | --- | --- | --- |
|  | 2 r.p.m. | | 20 r.p.m. | |
|  | Control | Alkali-treated | Control | Alkali-treated |
| Example: | | | | |
| 1(a) | 2,100 | 260 | 340 | 84 |
| 1(b) | 2,125 | 525 | 365 | 117.5 |
| 1(c) | 1,462 | 250 | 250 | 70 |
| 1(d) | 2,400 | 500 | 335 | 115 |

Example 2

Inks having a pigment loading suitable for newspaper printing were made directly by grinding the following compositions in the manner of Example 1:

|  | Parts by weight | |
|---|---|---|
|  | Control | Alkali-treated |
| 2(a) |  |  |
| Ink Oil (a) of Example 1 | 89 | 88.85 |
| Asphaltic Still Residue | 1 | 1 |
| Pelletized HAF Carbon Black | 10 | 10 |
| Sodium Hydroxide | -------- | 0.15 |
| 2(b) |  |  |
| Ink Oil (a) of Example 1 | 90 | 89.85 |
| Asphaltic Still Residue | -------- | -------- |
| Pelletized HAF Carbon Black | 10 | 10 |
| Sodium Hydroxide Flakes | -------- | -------- |

These inks exhibited the rheological properties shown in Table II below.

TABLE II

| Ink Concentrates | Brookfield Viscosities at 80° F., Spindle #4 | | | |
|---|---|---|---|---|
|  | 2 r.p.m. | | 20 r.p.m. | |
|  | Control | Alkali-treated | Control | Alkali-treated |
| Example: |  |  |  |  |
| 2(a) | 130 | 45 | 34 | 18.5 |
| 2(b) | 210 | 65 | 49 | 20 |

It is evident from Table II that inks which would have viscosities well above a sometimes required range of 15 to 20 poises (Brookfield #4 spindle at 20 r.p.m.) in the absence, or in the presence of only 1%, of asphaltic still residue can be prepared with a viscosity within that range by grinding them in the presence of a very small quantity of sodium hydroxide.

Example 3

The compositions listed in Table III below were each ground in a laboratory shaker ball mill at 200° F. for 30 minutes. Table III also shows rheological properties of the resulting ink concentrates.

The quantities of the alkali additions used in these tests are approximately equivalent stoichiometrically. As the data show, each of these basic inorganic compounds brought about a pronounced reduction of the viscosity of the ink concentrate.

Example 4

The tests of this example illustrate the effects of increasing amounts of sodium hydroxide in the grinding of ink dispersions containing 10% and 20% of furnace carbon black. The ingredients were ground as in Example 1. The compositions and their respective rheological properties are listed in Table IV, from which it is evident that increasing amounts of sodium hydroxide in the grinding mixtures resulted in progressively lower viscosities of the inks and ink concentrates, until the amount added was near 0.5%.

TABLE IV

| Ingredients (parts by weight) | Control | (a) Alkali-treated Inks | | | | |
|---|---|---|---|---|---|---|
|  |  | (1) | (2) | (3) | (4) | (5) |
| Ink Oil (a) of Example 1 | 89 | 88.99 | 88.25 | 88.9 | 88.75 | 88.50 |
| Asphaltic Still Residue | 1 | 1 | 1 | 1 | 1 | 1 |
| Pelletized HAF Carbon Black | 10 | 10 | 10 | 10 | 10 | 10 |
| Sodium Hydroxide | -------- | 0.01 | 0.05 | 0.1 | 0.25 | 0.5 |

Brookfield Viscosities at 80° F., Spindle #4

| | | | | | | |
|---|---|---|---|---|---|---|
| 2 r.p.m. | 130 | 105 | 100 | 85 | 27.5 | 25 |
| 20 r.p.m. | 34 | 28 | 27 | 23.5 | 15.5 | 14 |

| Ingredients (parts by weight) | Control | (b) Alkali-treated Concentrates | | | | |
|---|---|---|---|---|---|---|
|  |  | (1) | (2) | (3) | (4) | (5) |
| Ink Oil (a) of Example 1 | 78 | 77.95 | 77.9 | 77.75 | 77.5 | 77 |
| Asphaltic Still Residue | 2 | 2 | 2 | 2 | 2 | 2 |
| Pelletized HAF Carbon Black | 20 | 20 | 20 | 20 | 20 | 20 |
| Sodium Hydroxide | -------- | 0.05 | 0.1 | 0.25 | 0.5 | 1 |

Brookfield Viscosities at 80° F., Spindle #6

| | | | | | | |
|---|---|---|---|---|---|---|
| 2 r.p.m. | 2,100 | 1,450 | 1,125 | 275 | 250 | 250 |
| 20 r.p.m. | 340 | 250 | 210 | 82.5 | 72.5 | 72.5 |

Example 5

These tests illustrate the preparation of ink concentrates having increased loadings of carbon black by grinding the materials in the presence of sodium hydroxide. The compositions tested were ground as in Example 1. Their ingredients and viscosities are shown in Table V. From Example 5(b) it is evident that ink concentrates

TABLE III

| Ingredients (parts by weight) | Control | Alkali-treated Ink Concentrates | | | | | |
|---|---|---|---|---|---|---|---|
|  |  | 3(a) | 3(b) | 3(c) | 3(d) | 3(e) | 3(f) |
| Ink Oil (a) of Example 1 | 78 | 77.8 | 77.6 | 77 | 77.7 | 77.4 | 77.6 |
| Asphaltic Still Residue | 2 | 2 | 2 | 2 | 2 | 2 | 2 |
| Pelletized HAF Carbon Black | 20 | 20 | 20 | 20 | 20 | 20 | 20 |
| Lithium Hydroxide | -------- | 0.2 | -------- | -------- | -------- | -------- | -------- |
| Potassium Hydroxide | -------- | -------- | 0.4 | -------- | -------- | -------- | -------- |
| 28% Solution Ammonium Hydroxide | -------- | -------- | -------- | 1 | -------- | -------- | -------- |
| Calcium Hydroxide | -------- | -------- | -------- | -------- | 0.3 | -------- | -------- |
| Barium Hydroxide | -------- | -------- | -------- | -------- | -------- | 0.6 | -------- |
| Sodium Carbonate | -------- | -------- | -------- | -------- | -------- | -------- | 0.4 |

Brookfield Viscosities at 80° F., Spindle #6

| | | | | | | | |
|---|---|---|---|---|---|---|---|
| 2 r.p.m. | 2,100 | 1,265 | 525 | 1,075 | 925 | 395 | 1,475 |
| 20 r.p.m. | 340 | 242.5 | 111.5 | 200 | 167.5 | 95.5 | 242.5 | can be prepared with a carbon black concentration higher than otherwise feasible and still in the required fluid state, by grinding them in the presence of sodium hydroxide.

TABLE V

| Ingredients | Example 5(a) | | Example 5(b) | |
|---|---|---|---|---|
| | Control | Alkali-treated | Control | Alkali-treated |
| Ink Oil (a) of Example 1 | 78 | 77.7 | 67 | 66.05 |
| Asphaltic Still Residue | 2 | 2 | 3.5 | 3.5 |
| Pelletized HAF Carbon Black | 20 | 20 | 30 | 30 |
| Sodium Hydroxide | | 0.3 | | 0.45 |

| Brookfield Viscosities at 80° F., Spindle #6 | | | Spindle #7 |
|---|---|---|---|
| 2 r.p.m. | 2,100 | 260 | (*) | 3,900 |
| 20 r.p.m. | 340 | 84 | | 1,020 |

*Too viscous to cascade in ball mill.

Example 6

The following tests illustrate the preparation of ink concentrates containing 30% of furnace black in different oils, in the absence and in the presence of NaOH, followed by dilution of the alkali treated concentrates with the respective oils originally present to form inks containing 10% of carbon black and, finally, by additions of flocculating agents according to the invention to bring the inks to viscosities desirable for printing.

The compositions were ground as in Example I. Those ground in the absence of alkali were too viscous to cascade in the laboratory shaker ball mill; so useable dispersions were not obtained from them. The ingredients and viscosities of the various compositions are shown in Table VI below:

Example 7

The tests of this example illustrate the preparation of ink concentrates containing 30% of furnace black in the presence of NaOH, without the use of asphaltic still residue. The concentrates resulting were very fluid, and the inks obtained by diluting them to a desired pigment concentration had a very low viscosity unsuitable for printing. Be reversion with octanoic acid, a desired viscosity was achieved.

The ink oils used in this example were rich in polar compounds and had the following properties:

| | Ink Oils | | |
|---|---|---|---|
| | (e) | (f) | (g) |
| Viscosity, SSU | 720 | 750 | 750 |
| Specific gravity at 60° F | 0.9450 | 0.9180 | 0.9270 |
| Flash point, ° F | 355 | 380 | 375 |
| Color, ASTM D-1500 (diluted) | 5.0 | 7.0 | 8.0 |

An ink concentrate was prepared with each oil by grinding 69.5 parts of the oil, 30 parts of pelletized HAF carbon black and 0.5 part of NaOH flakes in a laboratory shaker ball mill at a temperature of 200° F. for 30 minutes.

Control compositions could not be prepared because they were too viscous to cascade in a laboratory shaker ball mill.

Table VII below shows the rheological properties of (A) the ground ink concentrates, (B) the inks obtained by diluting 35 parts of each ink concentrate with 65

TABLE VI

| Ingredients | Example 6(a) | | Example 6(b) | | Example 6(c) | |
|---|---|---|---|---|---|---|
| | Control | Alkali-treated | Control | Alkali-treated | Control | Alkali-treated |
| Ink Oil (b) of Example 1 | 66.0 | 65.55 | | | | |
| Ink Oil (c) of Example 1 | | | 66.5 | 66.05 | | |
| Ink Oil (d) of Example 1 | | | | | 66 | 65.55 |
| Asphaltic Still Residue | 4 | 4 | 3.5 | 3.5 | 4 | 4 |
| Pelletized HAF Carbon Black | 30 | 30 | 30 | 30 | 30 | 30 |
| Sodium Hydroxide | | 0.45 | | 0.45 | | 0.45 |

A. Ground Concentrates—Brookfield Viscosities at 80° F., Spindle #7

| | | | |
|---|---|---|---|
| 2 r.p.m. | 8,240 | 3,680 | 8,640 |
| 5 r.p.m. | 4,800 | 1,140 | 3,200 |

B. Ink obtained by diluting 33.7 parts of concentrate with 66.3 parts of respective oil—Brookfield Viscosities at 80° F., Spindle #4

| | | | |
|---|---|---|---|
| 2 r.p.m. | 52.0 | 50.0 | 52.0 |
| 20 r.p.m. | 19.0 | 14.5 | 16.5 |

C. Finished Inks, after flocculation by —

| | | | |
|---|---|---|---|
| (1) Water, .5%: | | | |
| 2 r.p.m. | 100 | | |
| 20 r.p.m. | 28.0 | | |
| (2) 2 N HCL, 1.0%: | | | |
| 2 r.p.m. | | 116.0 | 80.0 |
| 20 r.p.m. | | 32.0 | 23.0 |
| (3) Octanoic Acid, .35%: | | | |
| 2 r.p.m. | | 84.0 | 156.0 |
| 20 r.p.m. | | 25.0 | 36.5 | parts of the respective ink oil, and (C) the finished inks obtained by adding 0.4% of octanoic acid to each composition of the desired carbon black concentration:

TABLE VII

|  | Example 7(e) | Example 7(f) | Example 7(g) |
|---|---|---|---|
| A. Ink Concentrates—Brookfield Viscosity at 100° F., Spindle #6: | | | |
| 2 r.p.m. | 2,500 | 2,000 | 1,340 |
| 20 r.p.m. | 500 | 410 | 320 |
| B. Inks as diluted (at 10% carbon black)—Brookfield Viscosity at 80° F., Spindle #4: | | | |
| 2 r.p.m. | 30.0 | 16.0 | 10.0 |
| 20 r.p.m. | 12.5 | 10.5 | 8.0 |
| C. Finished Inks at Printing Viscosities—Brookfield Viscosity at 80° F., Spindle #4: | | | |
| 2 r.p.m. | 82 | 62.0 | 44.0 |
| 20 r.p.m. | 23 | 18.5 | 15.5 |

*Example 8*

The procedures of Example 1 were followed with the use of the alkaline substances sepcified in Table VIII below, instead of sodium hydroxide. The resulting ink concentrates exhibited the properties shown in Table VIII.

TABLE VIII

| Ink Concentrates | Brookfield Viscosities at 80° F., Spindle #6 | |
|---|---|---|
|  | 2 r.p.m. | 20 r.p.m. |
| Control Example 1(a) | 2,100 | 340 |
| (a) Sodium (metal), 0.172% | 180 | 61 |
| (d) Potassium (metal), 0.29% | 185 | 62 |
| (c) Lithium butyl, 0.5% | 200 | 72 |

*Example 9*

In the tests of this example, inks were prepared by grinding the materials into ink concentrates as in Example 1, diluting the concentrates with ink oil to obtain inks of normal pigment loading, and then increasing the viscosity of the inks by incremental additions of water.

The dispersing procedures were varied as follows:

(a) The concentrate was ground in the presence of alkali, and normal ink oil was used for the diluting;

(b) The ink oil used for the dilution was previously reacted with alkali, the concentrate being ground in the absence of alkali; and (c) A concentrate ground in the presence of alkali was diluted with ink oil previously reacted with alkali.

The ink oil used was the same as ink oil (d) of Example 1. The amounts of it used for dilution in tests (b) and (c) were pre-treated by grinding 99.7 parts by weight of the ink oil with 0.3 part of sodium hydroxide flakes in a laboratory shaker ball mill at 200° F. for 30 minutes.

The ingredients and viscosities of the various dispersions formed are shown in the following Table IX.

TABLE IX

| Ink Concentrates | Parts by weight | | |
|---|---|---|---|
|  | (a) | (b) | (c) |
| Ink oil (d), Ex. 1 | 77.7 | 78 | 77.7 |
| Asphaltic Still Residue | 2 | 2 | 2 |
| Pelletized HAF Carbon Black | 20 | 20 | 20 |
| Sodium Hydroxide | 0.3 | | 0.3 |
| Dilution: | | | |
| Ink oil (d), Ex. 1 | 100 | | |
| Same, alkali-treated | | 100 | 100 |
|  | 200 | 200 | 200 |

| Ink Viscosities at 80° F. | Brookfield Spindle #4 at 20 r.p.m. | | |
|---|---|---|---|
| Upon dilution | 19 | 18.5 | 13.5 |
| Upon Flocculation by— | | | |
| 0.5 part water | 26.5 | 25 | 28.5 |
| 1 part water | 44 | 43 | 32 |

From the data in Table IX it is evident that the alkali reaction brought about approximately the same reduction of ink viscosity whether effected in the course of the grinding of the concentrate or by pre-treatment of the oil used for dilution of the ground concentrate; and where the same amounts of alkali had been reacted additions of water to the inks brought about approximately the same increases of ink viscosity.

*Example 10*

In the tests of this example, various inks and ink concentrates prepared according to preceding examples were brought to a pigment concentration of 10% and were then increased in viscosity by various additions of flocculating liquids as shown in Table X below, which also shows the comparative viscosities of the various dispersions formed.

TABLE X

|  | Inks—Example 2(a) | | Alkali-treated Ink Concentrates | |
|---|---|---|---|---|
|  | Control | Alkali-treated | (a) Ex. 1(a) | (b) Ex. 5(b) |
| Dilution | 100 | 100 | 50 | 33.3 |
| Ink oil (a) of Example 1 | | | 50 | 67.7 |
| Ink at 10% pigment | 100 | 100 | 100 | 100 |

| Ink Viscosities at 80° F.—Brookfield Spindle #4 | | | | |
|---|---|---|---|---|
| Ink as above: | | | | |
| 2 r.p.m. | 130 | 45 | 45 | 47.5 |
| 20 r.p.m. | 34 | 18.5 | 16 | 17 |
| Ink flocculated by: | | | | |
| (1) Water, 0.6%— | | | | |
| 2 r.p.m. | | | 115 | |
| 20 r.p.m. | | | 36 | |
| (2) Palmitic acid, 0.5%— | | | | |
| 2 r.p.m. | | 135 | | |
| 20 r.p.m. | | 34 | | |
| (3) Nonanoic acid, 0.4%— | | | | |
| 2 r.p.m. | | | 125 | |
| 20 r.p.m. | | | 33.5 | |
| (4) 2 N HCl, 2%— | | | | |
| 2 r.p.m. | | | | 145 |
| 20 r.p.m. | | | | 35 |
| (5) Palmitic acid— | | | | |
| (a) 0.25%: | | | | |
| 2 r.p.m. | | | | 85 |
| 20 r.p.m. | | | | 26 |
| (b) 0.5%: | | | | |
| 2 r.p.m. | | | | 125 |
| 20 r.p.m. | | | | 34 |
| (c) 1%: | | | | |
| 2 r.p.m. | | | | 160 |
| 20 r.p.m. | | | | 43 |

*Example 11*

A news ink was prepared to contain 10.5% HAF furnace black and 2.45% of asphaltic still residue ("Coblax") ground in an ink oil at 200° F. for 30 minutes.

Inks having the same pigment loading were prepared in the same way except that the materials were ground in the presence of (a) 0.105%, (b) 0.157% and (c) 0.262% of sodium hydroxide, based upon the weight of the ink.

The several inks obtained were flocculated by mixing into them incremental amounts of water, as indicated in Table XI below. Brookfield viscosities taken at various stages of the process are also indicated in the table.

TABLE XI

| Flocculation | Ink Viscosities at 80° F.—Brookfield Spindle #4 at 20 r.p.m. | | | |
|---|---|---|---|---|
| | Control Ink, No Alkali | Alkali-treated Inks | | |
| | | (a) 0.105% NaOH | (b) 0.157% NaOH | (c) 0.262% NaOH |
| Amounts of Water Added, Percent of Ink Wt.: | | | | |
| None | 22 | 14 | 8 | 8 |
| 0.1% | | 18 | | |
| 0.5% | 22 | 50 | 32 | 26 |
| 0.6% | | 118 | | |
| 0.68% | | 75 | | |
| 0.85% | | 42 | 160 | |
| 1.0% | 22 | 38 | 84 | 64 |
| 1.2% | | | | >400 |
| 1.3% | | | 40 | |
| 1.6% | | | 34 | 68 |
| 2.1% | 22 | | | 36 |

From the data in Table XI and the graphs in FIGS. 2 and 3 of the drawings it will be evident that increasing additions of water will bring news inks previously reduced in viscosity by products of the reaction of alkali with the acidic oil vehicle to viscosities far exceeding those possessed by the inks in the absence of the alkali reaction. It is further evident that a peak viscosity is reached with a certain amount of added water in each case. Although further additions of water then cause the viscosity to drop rapidly, this reduction levels off at a viscosity still much above that of the ink not treated with alkali.

Similar phenomena occur in the use of other flocculating liquids according to the invention, as is evident from the graphs of FIG. 4.

The viscosities of news inks and ink concentrates prepared on a laboratory scale by the use of a laboratory shaker ball mill, as in the foregoing examples, are considerably higher than those of the same ink composition prepared by the use of production grinding equipment such as a production ball mill or a colloid mill. The laboratory compositions generally have viscosities about 20 to 30% higher than the compositions prepared in a production ball mill.

It is to be understood that the invention herein disclosed and defined by the appended claims can be carried out in many ways other than those particularly mentioned above or illustrated by the examples. The invention is not intended to be limited by particulars of the foregoing description or examples, or by illustrations of the drawings, except as may be required for fair interpretation of the claims.

What is claimed is:

1. A method of preparing news ink or like having a desired pigment concentration in the range of about 5 to 15% by weight together with a selected viscosity desired for the printing of the ink, in the range of about 15 to 40 poises as measured at 80° F. by a Brookfield RVF Viscosimeter using spindle No. 4 at 20 r.p.m., which comprises mechanically dispersing carbon black at a concentration at least equal to said desired pigment concentration in a liquid vehicle consisting essentially of mineral hydrocarbon oil, in the presence of less than 1% by weight of moisture said oil comprising the product of the reaction at an elevated temperature below 300° F. of a mineral hydrocarbon oil containing polar petroleum compounds and having an acid number of 0.1 to 5, with a substance selected from the group consisting of the alkali metals, calcium, barium and strontium and alkaline reacting compounds thereof and of ammonium, in an amount equivalent in neutralizing power to 0.01 to about 0.5% of NaOH, based upon the weight of said oil, the amount of said reaction product being sufficient to give the dispersion formed a viscosity substantially below that of a composition made the same way but with the oil not reacted with said alkaline substance.

2. A method of preparing news ink or like having a desired pigment concentration in the range of about 5 to 15% by weight together with a selected viscosity desired for the printing of the ink, in the range of about 15 to 40 poises as measured at 80° F. by a Brookfield RVF Viscosimeter using spindle No. 4 at 20 r.p.m., which comprises mechanically dispersing non-acidic carbon black at a concentration at least equal to said desired pigment concentration in a liquid vehicle consisting essentially of mineral hydrocarbon oil, in the presence of less than 1% by weight of moisture said oil comprising the product of the reaction at an elevated temperature below 300° F. of a mineral hydrocarbon oil containing polar petroleum compounds and having an acid number of 0.1 to 5, with a substance selected from the group consisting of (1) the alkali metals and alkaline reacting compounds of such metals and of ammonium and (2) calcium, barium and strontium and alkaline reacting compounds thereof, in an amount equivalent in neutralizing power to 0.01 to about 0.5% of NaOH, based upon the weight of said oil, the amount of said reaction product being sufficient to give the dispersion formed a viscosity substantially below that of a composition made the same way but with the oil not reacted with said alkaline substance; and thereafter mixing into said dispersion, in the case of said substance having been selected from said subgroup (1) a substance selected from the group consisting of water, glycerine and acids, and in the case of said substance having been selected from said subgroup (2) an acid strong enough to decompose organic alkaline earth metal compounds, in a small quantity effecting a desired increase of the viscosity of said dispersion.

3. A method of preparing news ink or like having a desired pigment concentration in the range of about 5 to 15% by weight together with a selected viscosity desired for the printing of the ink, in the range of about 15 to 40 poises as measured at 80° F. by a Brookfield RVF Viscosimeter using spindle No. 4 at 20 r.p.m., which comprises grinding carbon black at a concentration exceeding said desired pigment concentration in a liquid vehicle consisting essentially of mineral hydrocarbon oil and thereafter diluting the dispersion with mineral hydrocarbon oil in an amount bringing it to said desired pigment concentration, the mixture of said oils and said carbon black containing less than 1% by weight of moisture at least one of said oils comprising the product of the reaction at an elevated temperature below 300° F. of a mineral hydrocarbon oil containing polar petroleum compounds and having an acid number of 0.1 to 5 with a substance selected from the group consisting of the alkali metals, calcium, barium and strontium and alkaline reacting compounds thereof and of ammonium, in an amount equivalent in neutralizing power to 0.01 to about 0.5% of NaOH, based upon the weight of said oil, the amount of said reaction product being sufficient to give the diluted dispersion formed a viscosity substantially below that of a composition made the same way but with the oil not reacted with said alkaline substance.

4. A method of preparing news ink or like having a desired pigment concentration in the range of about 5 to 15% by weight together with a selected viscosity desired for the printing of the ink, in the range of about 15 to 40 poises as measured at 80° F. by a Brookfield RVF Viscosimeter using spindle No. 4 at 20 r.p.m., which comprises grinding non-acidic carbon black at a concentration exceeding said desired pigment concentration in a liquid vehicle consisting essentially of mineral hydrocarbon oil and thereafter diluting the dispersion with mineral hydrocarbon oil in an amount bringing it to said desired pigment concentration, the mixture of said oils and said carbon black containing less than 1% by weight of moisture at least one of said oils comprising the product of the reaction at an elevated temperature below 300° F. of a mineral hydrocarbon oil containing polar petroleum compounds and having an acid number of 0.1 to 5 with a substance selected from the group consisting of (1) the alkali metals and alkaline reacting compounds of such metals and of ammonium and (2) calcium, barium and strontium and alkaline reacting compounds thereof, in an amount equivalent in neutralizing power to 0.01 to about 0.5% of NaOH, based upon the weight of said oil, the amount of said reaction product being sufficient to give the diluted dispersion formed a viscosity substantially below that of a composition made the same way but with the oil not reacted with said substance; and thereafter mixing into the diluted dispersion, in the case of said substance having been selected from said subgroup (1) a substance selected from the group consisting of water, glycerine and acids, and in the case of said substance having been selected from said subgroup (2) an acid strong enough to decompose organic alkaline earth metal compounds, in a small quantity increasing the viscosity of said diluted dispersion to the value selected for the printing.

5. A method of preparing news ink or like having a selected pigment concentration in the range of about 5 to 15% by weight together with a selected viscosity desired for the printing of the ink, in the range of about 15 to 40 poises as measured at 80° F. by a Brookfield RVF Viscosimeter using spindle No. 4 at 20 r.p.m., which comprises grinding carbon black at a concentration of about 20 to about 35% by weight in a liquid vehicle consisting essentially of a mineral hydrocarbon oil containing polar petroleum compounds and having an acid number of 0.1 to 5 and in the presence of an alkaline-reacting alkali metal compound in a selected amount equivalent in neutralizing power to 0.01 to about 0.5% of NaOH, based upon the weight of said oil, the grinding mixture containing natural moisture in an amount less than 1% by weight and the grinding being continued until a fluid dispersion has been formed having a viscosity substantially below that of a dispersion made the same way but in the absence of alkali; and thereafter diluting said fluid dispersion with mineral hydrocarbon oil in an amount bringing it to the selected pigment concentration.

6. A method of preparing news ink or like having a selected pigment concentration in the range of about 5 to 15% by weight together with a selected viscosity desired for the printing of the ink, in the range of about 15 to 40 poises as measured at 80° F. by a Brookfield RVF Viscosimeter using spindle No. 4 at 20 r.p.m., which comprises grinding non-acidic furnace carbon black at a concentration of about 20 to about 35% by weight in a liquid vehicle consisting essentially of a product of the reaction, at an elevated temperature below 300° F., of an acidic mineral hydrocarbon oil containing polar petroleum compounds and having an acid number of 0.1 to 5 with an alkaline-reacting compound of a substance selected from the group consisting of alkali metals and ammonium in an amount sufficient substantially to neutralize the acidity of said oil, the grinding mixture containing natural moisture in an amount less than 1% by weight and the grinding being continued until a fluid dispersion has been formed havving a viscosity substantially below that of a composition made the same way but with the oil unreacted with such compound; and thereafter diluting said fluid dispersion with mineral hydrocarbon oil in an amount bringing it to the selected pigment concentration, and mixing into it a substance selected from the group consisting of water, glycerine and acids in a small quantity increasing its viscosity to the value selected for the printing.

7. A method according to claim 6, said reaction product being formed in the course of the grinding by grinding said pigment in said oil in the presence of said alkaline-reacting compound.

8. A method according to claim 6, said alkaline-reacting compound being an alkali metal hydroxide.

9. A method according to claim 6, said viscosity increasing substance being water.

10. A method according to claim 6, said acidic oil being a solution of asphaltic still residue in a petroleum oil.

11. A method according to claim 7, said alkaline-reacting compound being sodium hydroxide and being incorporated into the grinding mixture in an amount of from 0.01 to 0.5% by weight.

12. A method according to claim 1, the carbon black and the vehicle being susbtantially anhydrous and said substance being a metal selected from the group consisting of the alkali metals, calcium, barium and strontium.

13. A printing ink composition consisting essentially of a fluid dispersion of from about 5 to about 35% by weight of non-acidic carbon black in a liquid vehicle consisting essentially of a mineral hydrocarbon oil comprising the product of the reaction at an elevated temperature below 300° F., in the present of less than 1% of moisture, of a mineral hydrocarbon oil containing polar petroleum compounds and having an acid number of 0.1 to 5 with an amount equivalent in neutralizing power to 0.01 to 0.5% of NaOH, based upon the weight of said oil, of a substance selected from the group consisting of the alkali metals, calcium, barium and strontium and alkaline-reacting compounds thereof and of ammonium, said dispersion having a viscosity substantially below that of a composition otherwise the same in which the oil has not been reacted with such substance, being amenable to controlled reductions of its pigment concentration and viscosity by dilution with mineral hydrocarbon oil, and being amenable to controlled increases of its viscosity by the admixture with it of minute quantities of water or of an acid.

14. A printing ink concentrate consisting essentially of a fluid dispersion produced by grinding at an elevated temperature below 300° F. about 20% to about 35% by weight of non-acidic furnace carbon black in a liquid vehicle consisting essentially of mineral hydrocarbon oil containing polar petroleum compounds, and having an acid number of 0.1 to 5, in the presence of less than 1% of moisture and of an alkaline-reacting alkali metal compound in an amount equivalent in neutralizing power to 0.01 to 0.5% of NaOH, based upon the weight of said oil, said dispersion having a viscosity substantially below that of a composition otherwise the same prepared in the absence of said compound, being amenable to controlled reductions of its pigment concentration and viscosity by dilution with mineral hydrocarbon oil, and being amenable to controlled increases of its velocity by the admixture with it of minute quantities of water.

15. A printing ink concentrate according to claim 14, wherein the concentration of said carbon black is in the range of about 27 to 35%.

16. A printing ink of selected viscosity and selected pigment concentration, consisting essentially of a fluid composition obtained by the admixture of a selected amount of water, glycerine or an acid into a fluid dispersion obtained by diluting with mineral hydrocarbon oil, to a selected pigment concentration in the range of about 5 to 15%, a fluid ink concentrate produced by grinding at an elevated temperature below 300° F. about 20% to about 35% by weight of non-acidic furnace carbon black in a liquid vehicle consisting essentially of mineral hydrocarbon oil containing polar petroleum compounds, and having an acid number of 0.1 to 5, in the presence of less than 1% of moisture and of an alkaline-reacting alkali metal compound in an amount equivalent in neutralizing power to 0.01 to 0.5% of NaOH, based upon the weight of said oil.

(References on following page)

References Cited

UNITED STATES PATENTS

| | | | |
|---|---|---|---|
| 1,705,825 | 3/1929 | Odeen | 208—287 |
| 2,453,558 | 11/1948 | Voet | 106—32 |
| 2,852,398 | 9/1958 | Goessling | 106—311 XR |
| 2,891,872 | 6/1959 | Voet | 106—32 XR |
| 2,960,413 | 11/1960 | Voet | 106—32 XR |
| 2,967,782 | 1/1961 | Manley | 106—32 XR |
| 3,010,794 | 11/1961 | Friauf et al. | |
| 3,010,795 | 11/1961 | Friauf et al. | |
| 3,075,844 | 1/1963 | Hall et al. | 106—32 XR |
| 3,199,991 | 8/1965 | Schelling et al. | 106—32 |

FOREIGN PATENTS 620,423  11/1962  Belgium.

ALEXANDER H. BRODMERKEL, *Primary Examiner.*

J. B. EVANS, *Assistant Examiner.*